Feb. 28, 1950     C. A. KOTTERMAN     2,498,890
RECTIFIER UNIT
Filed June 3, 1947
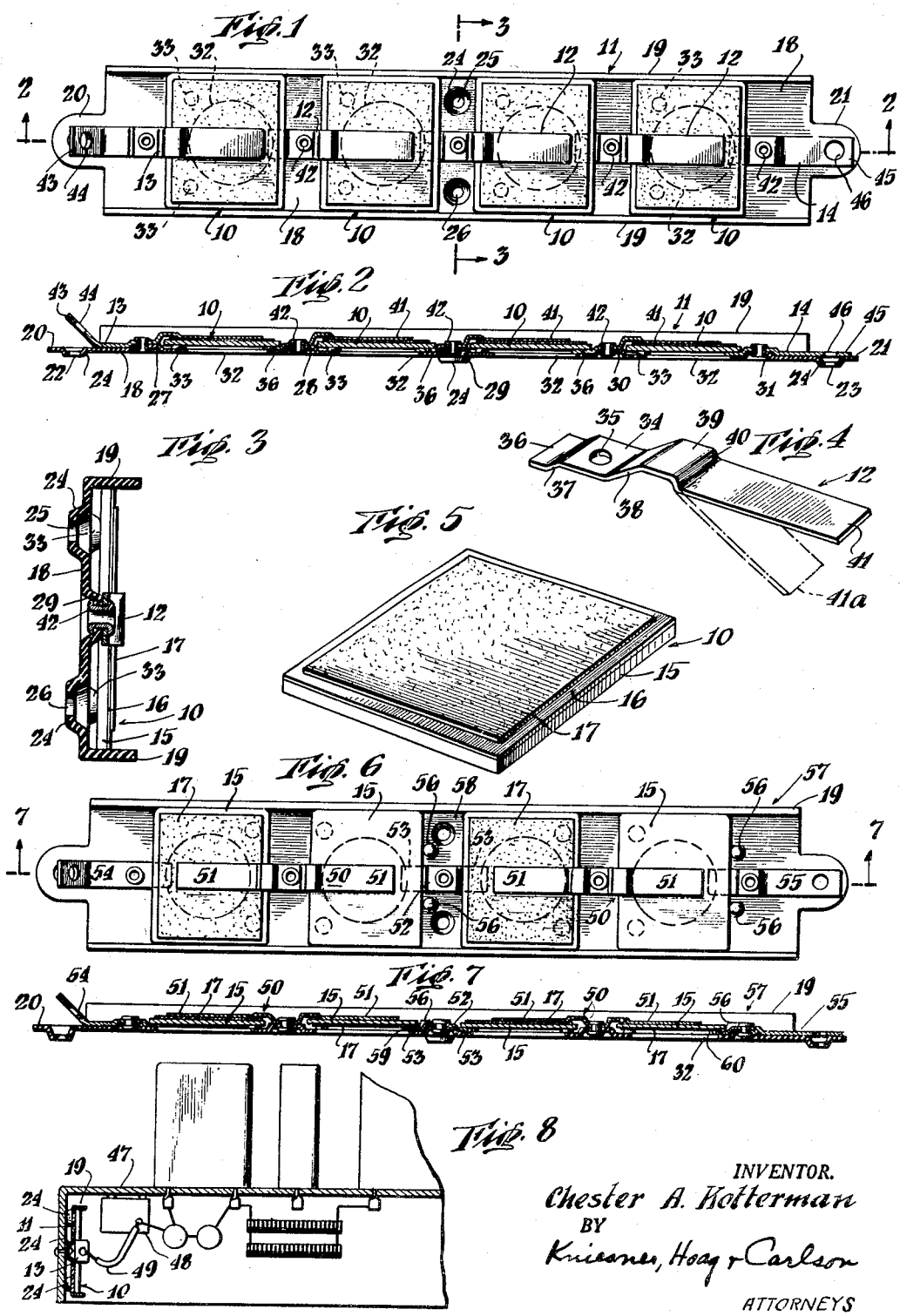
INVENTOR.
Chester A. Kotterman
BY
Kinesmes, Hoag & Carlson
ATTORNEYS Patented Feb. 28, 1950

2,498,890

UNITED STATES PATENT OFFICE 2,498,890

RECTIFIER UNIT

Chester A. Kotterman, New York, N. Y., assignor to Kotron Rectifier Corporation, Newark, N. J., a corporation of New Jersey Application June 3, 1947, Serial No. 752,201

15 Claims. (Cl. 175—366)

This invention relates to metal plate rectifier units comprising asymmetrically conductive couples.

This application is a continuation-in-part of my prior-filed copending application, Serial No. 601,958, filed June 28, 1945.

An object of the invention is to improve metal plate rectifier units. Another object is to improve the means for mounting metal plate rectifiers in a unit assembly.

According to the present invention the improved metal plate rectifier unit may comprise a plurality of metal plate rectifiers disposed in substantially the same plane, a receptacle formed at least in part of insulating material holding said rectifiers, said receptacle being of a thickness in a direction perpendicular to the plane of said rectifiers which is small in relation to its other two dimensions, and conductive bridging elements electrically connecting together oppositely polarized faces of adjacent rectifiers to connect said plurality of rectifiers together in series, whereby said rectifier unit comprises a relatively flat assembly having the spacial dimension which is perpendicular to the plane of said rectifiers relatively smaller than the other two spacial dimensions.

The invention accordingly consists in the features of construction, combination of elements, and arrangement of parts as will be exemplified in the structure to be hereinafter described.

In the accompanying drawings in which is shown by way of illustration one of the various possible embodiments of this invention, Figure 1 is a face view of a rectifier unit embodying features of the present invention;

Figure 2 is a section on the line 2—2 of Figure 1;

Figure 3 is a section on the line 3—3 of Figure 1;

Figure 4 is a perspective view of a metal strip formed into one of the conductive bridging elements of the unit;

Figure 5 is a perspective view of a metal plate rectifier for use in the unit;

Figure 6 is a face view of another form of the rectifier unit;

Figure 7 is a section on the line 7—7 of Figure 6; and

Figure 8 is a fragmentary view illustrating a rectifier unit mounted for use beneath the chassis of a radio set or piece of electronic equipment.

Similar reference characters refer to similar parts throughout the several views of the drawings.

There are several forms of metal plate rectifiers in general use. The three most widely used varieties of such rectifiers are those commonly identified as selenium rectifiers, copper oxide rectifiers and copper sulphide rectifiers. Each of them forms a metal plate or metal plate assembly embodying an asymmetrically conductive couple, whereby the rectifier comprises an asymmetrical or polarized element when connected in an electrical circuit, permitting flow of electricity in one direction and substantially preventing flow in the opposite direction. Thus, for example, a selenium rectifier may comprise a metal base plate carrying an adhering coating of selenium on one of its faces, the selenium being treated to provide a blocking layer on its surface and the surface being coated with conductive contact layer, such as a layer of sprayed metal. Electrical connections to the rectifier are made by making contact with the metal plate backing and with the sprayed metallic coating. A copper oxide rectifier may comprise a copper disc or plate which has been oxidized to form an adherent oxide coating over its surface to which contact is made by a conductive coating. A copper sulphide rectifier may comprise a copper sulphide disc or plate produced by sulphiding a copper or brass disc or plate, the sulphide portion being in contact with a magnesium member, the assembly being electrically formed or treated to provide a blocking layer or asymmetrically conductive layer between the plates.

In the use of such rectifier elements for most electrical applications, such as for rectifying alternating current of commercial voltages, it is usually necessary to connect several of the rectifiers in electrical series. This has customarily been done in the past by arranging the rectifier plates one above the other, in a stack assembly with suitable clamping means to hold them in contact. The usual practice has been to provide holes through each of the individual rectifier plates and pass a bolt, screw, threaded stud, rivet or eyelet through the aligned holes of the stack assembly thus clamping the assembly together by any one of these mechanical means.

The present invention departs from this accepted mode of assembly and achieves several advantages over such prior assemblies, these advantages being particularly desirable for certain applications of the rectifier units, such as those in which the units are required to be mounted in limited space.

The present invention also provides a rectifier unit having more efficient cooling of the rectifier plates than the stack assemblies used heretofore. For instance, in the conventional stack assembly where one rectifying element or plate is mounted above the next or alongside its neighbor, the heat generated and given off by each rectifier will, by radiation and convection, tend to heat the adjacent plate or plates, thus adding to the overall operating temperature of the assembly. This is of vital importance because it is an established fact in the metal plate rectifier art that the life of any metal plate rectifier is a direct function of its operating temperature. In the present invention the individual rectifying elements or plates are disposed substantially in a plane. Therefore, one rectifier cannot contribute to the heating of its neighbor or adjacent member, thus reducing the overall operating temperature. It is also very economical of construction and assembly and permits ready replacement of individual rectifier plates and other parts at any time during the life of the unit.

In one application of the present invention the rectifier is mounted on or within the chassis of a radio set or other piece of electronic equipment where it may serve as a rectifier in place of the usual rectifier tube now provided.

In the following detailed description the invention will be set forth as applied to the mounting of selenium rectifiers but it will be apparent that the invention can likewise be applied to other forms of metal plate rectifiers such as the copper oxide and copper sulphide varieties.

While a preferred embodiment of the invention is described herein, it is contemplated that considerable variation may be made in the method of procedure and the construction of parts without departing from the spirit and scope of the invention. In the following description and in the claims, parts will be identified by specific names for convenience, but they are intended to be as generic in their application to similar parts as the art will permit.

Referring to the drawings a metal plate rectifier unit is illustrated in Figures 1, 2 and 3 comprising four selenium rectifiers 10 mounted in a receptacle 11, preferably formed of insulating material such as resin-impregnated fibre. The rectifiers 10 are connected together in electrical series by a series of conductive bridging elements 12, the series of elements being provided with conductive and terminal members 13 and 14.

One of the selenium rectifiers 10 is shown more clearly in Figure 5. The rectifier comprises a metal plate 15 formed of a suitable metal such as steel or aluminum having a coating 16 of metallic selenium over one surface. This coating may be applied by any of the methods commonly used in selenium rectifier manufacture such as by pressing a layer of powdered selenium against the surface under high pressure and the simultaneous application of heat, by spreading a layer of molten or partially molten selenium over the surface, by evaporating the selenium in a vacuum chamber and condensing it onto the surface of the metal plate, or by electrolytically depositing selenium. All of these methods of making selenium rectifiers are well known and fully described in the art.

The upper surface of the selenium layer, that is the one remote from the supporting base plate, is provided with a so-called "blocking layer" which is practically invisible. This layer may be formed by any of the methods known to the art such as by oxidation, exposure to certain gaseous atmospheres or by other methods.

A conductive contact layer 17 is applied to the surface of selenium layer 16 over the blocking layer. This may comprise an applied layer of low melting point metal or low melting point metal alloy vaporized or otherwise deposited onto the surface in molten condition and allowed to solidify into a layer thereon. In order to reduce the danger of a short circuit connection between metal layer 17 and the base plate 15 at the edge of the rectifier plate it is preferable that the dimensions of metal layer 17 be somewhat smaller than those of metal plate 15, as shown, so as to allow a narrow margin of the selenium layer 16 to remain exposed around the border of the plate. This can readily be accomplished during manufacture of the rectifier by applying a mask over the edges of the plate during the application of the metal layer 17 onto the selenium layer. The invisible blocking layer, which has been formed on the surface of selenium layer 16, gives rectifying properties to each rectifier plate. In other words, each plate is asymmetrically conductive or polarized in such a manner that it will conduct electric current in one direction but will prevent any substantial flow of current in the opposite direction.

In the completed rectifier plate illustrated in Figure 5, the metal base plate 15 and the applied metal layer 17 serve as conductive terminals or contacts for the individual rectifiers. These contact surfaces are engaged by bridging elements 12 and terminal elements 13 and 14 in the rectifier unit in such a manner as to connect the individual rectifiers together in electrical series.

In the rectifier unit illustrated four of the rectifier plates 10 are held in receptacle 11 in the same plane or substantially so. It is obvious, of course, that fewer or more than four rectifying plates may comprise the assembly, depending upon the conditions and requirements of the application. Receptacle 11 may be formed of any suitable material of sufficient mechanical strength, at least part of which is insulating so that the individual rectifiers will not be short circuited. The receptacle may preferably be formed entirely of sheet insulating material such as a paper-like fibre which has been impregnated with a thermosetting resin such as phenol-formaldehyde resin, urea resin or any other of the well known types of thermosetting resins which can be used for this purpose. It is contemplated, however, that other resins not of the thermosetting variety can likewise be used and that in some cases sheet fibrous materials can be used without resin impregnation provided they are of sufficient stiffness and of good electrical properties.

The receptacle 11 may be formed from a sheet of the resin impregnated fibre by punching the sheet with the required holes and other formations and bending the sheet into the channel form illustrated with the application of heat to vulcanize or set the resin and provide the finished receptacle.

Receptacle 11 comprises a substantially plane body portion 18 having upturned edges 19 to provide a shallow channel. The ends of body 11 are provided with mounting tabs 20 and 21 comprising rounded extensions of the flat body portion. These tabs are punched with mounting holes 22 and 23 and the sheet material surrounding the holes is formed downward to provide annular bosses 24 to space the body portion 18 away from any surface on which the unit is mounted. Another pair of mounting holes 25 and 26 are punched in the mid-portion of body 11 close to flanges 19, these holes likewise being surrounded by downwardly formed bosses 24 so as to provide two additional points of support to space the unit away from a surface upon which it is to be mounted.

Along the center of body portion 18 between end mounting holes 22 and 23 is provided, at spaced intervals, a series of raised bosses 27, 28, 29, 30 and 31, each provided with a mounting hole. These bosses extend upward from the body of the receptacle, that is in a direction opposite to bosses 24.

Bosses 27 to 31, together with flanges 19, define generally rectangular areas in which rectifier plates 10 are mounted. Bosses 27 to 31 rise substantially vertical above the plane of receptacle 11 thus forming definite limits to the longitudinal movement of the rectifier plates 10 when positioned between the bosses. The flange members 19 of receptacle 11 prevent any appreciable lateral movement of the rectifier plates 10. Thus the rectifier plates are definitely located in proper position in receptacle 11. The center of each of these areas is punched out to leave a relatively large hole 32 and a pair of small bosses 33 are formed up in each area along the right hand side of holes 32 as seen in Figure 1 of the drawing, one adjacent to each of flanges 19. Bosses 33 stand above the surface of body portion 18 by a distance substantially equal to the thickness of the material from which bridging elements 12 are formed.

One of bridging elements 12 is shown in perspective view in Figure 4. It comprises a strip of sheet metal of good electric contact properties and preferably is of resilient spring material, such as phosphor bronze. The strip is formed to provide a flat mounting portion 34 near one end in which a hole 35 is punched. The short end 36 projecting in one direction from mounting portion 34 is parallel to but offset from portion 34 by a sloping connection portion 37 forming a downward step. On the opposite side of mounting portion 34 a sloping connecting portion 38 extends upward and outward from the mounting portion ending in a second connecting portion 39 which is parallel to mounting portion 34. A small step 40 at the outer edge of portion 39 joins this portion to the projecting spring finger 41 comprising the other end of strip 12. The bridge portion thus formed is of advantage as it prevents the possibility of any part of bridging element 12 making electrical contact with any part of rectifier 10 except the metallic layer 17. Without the hump or arch formed by sections 38, 39 and 40 of bridging element 12 there might be the possibility of some part of 12 contacting part 15 of the rectifier thus causing an electrical short circuit. Spring finger 41 is preferably given an original bias to bring it into position 41a, indicated by dotted lines in Figure 4, when bridging element 12 is ready for mounting on the receptacle.

Elements 12 are mounted on bosses 28, 29 and 30 of receptacle 11 by rivet-like members such as eyelets 42 passing through holes 35 and the holes in bosses 28, 29 and 30 respectively and spun over. When so mounted end 36 of each of elements 12 will lie against the flat body portion 18 of receptacle 11 and will extend substantially to the edge of one of holes 32 in the receptacle. Spring finger 41 will extend in the opposite direction of the next adjacent hole 32 in the receptacle and substantially diametrically across the hole. Finger 41 will terminate however somewhat short of the edge of hole 32 so that it will be biased to position 41a shown in Figure 4 before rectifiers 10 are inserted in the receptacle.

In order to insert rectifiers 10 it is simply necessary for the operator to press spring finger 41 upward from underneath hole 32 and then slide plate rectifier element 10 under the spring finger and into a position overlying hole 32 as shown in Figures 1, 2 and 3. Rectifier 10 will then rest upon a three point suspension comprising the two projections or bosses 33 and the end 36 of the next adjacent bridging element 12. It will thus be evident that, as seen in Figures 1 and 2, spring finger 41 of one of the bridging elements connects contact layer 17 of one rectifier plate 10 with the next adjacent rectifier to the left and that end 36 of another bridging element 12 connects the bottom face of plate 15 of element 10 with the next adjacent rectifier to the right.

End terminal 13 is generally similar to one of bridging elements 12, but differs from it in that it is provided with a longer tab 43 punched with a hole 44 which overlies mounting hole 22 on mounting tab 20 of the receptacle. Terminal 14 at the other end of the unit is also similar to one of bridging elements 12 with the exception that a tab 45 carrying a hole 46 takes the place of spring finger 41. Hole 45 is disposed over mounting hole 23 in tab 21 of the receptacle. Connecting portions 38 and 39 may also be eliminated in this tab construction.

In some applications of the rectifier unit it is desirable to mount it on a sheet metal support such as the chassis of a radio set or piece of electronic equipment and to "ground" one end of the series of rectifiers to the support. This can be conveniently accomplished with the rectifier unit illustrated by passing the mounting rivet or screw through hole 44 or 46 in one of the terminal members as well as through the mounting hole 22 or 23 in the receptacle to effect mounting of the unit and grounding of one terminal in the same operation. When it is not desired to ground the terminal however, tab 43 or 45 may be bent upward as shown for tab 43 in Figures 1 and 2 and the mounting rivet or screw inserted only through mounting hole 22 or 23 in the receptacle member.

Figure 8 shows the rectifier unit mounted underneath the chassis 47 of a radio set. This illustrates the adaptability of the unit to mounting in limited space which is crowded with other apparatus such as parts 48 of the radio set. Due to its wafer-like shape it fits snugly along the mounting panel and without projecting into interfering relation with the other parts.

In the preferred embodiment illustrated in Figures 1 to 3 four of the rectifiers 10 are mounted with contact layers 17 facing in the same direction and with the bridging elements extending from the under side of one rectifier plate into contact with the top surface with the next adjacent rectifier. Figures 6 and 7 illustrate a modification in which alternating rectifiers face in opposed directions. Thus starting from the left in Figure 6, the first rectifier has contact layer 17 facing upward. In the second rectifier layer 17 faces downward so that plate 15 is on top. In the third rectifier layer 17 is again up and in the fourth rectifier layer 17 faces downward. A pair of bridging elements 50 having spring fingers 51 at both ends are mounted on receptacle 57 between the first and second and between the third and fourth rectifiers, respectively, with the spring fingers overlying the top surfaces of the rectifiers. A bridging element 52 having both ends 53 similar to ends 36 of element 12 is secured to receptacle 57 between the second and third rectifiers with ends 53 extending underneath two rectifier plates. A pair of end terminals 54 and 55 similar to terminal 45, mounted at the ends of the receptacle extend under the first and fourth rectifier plates to provide terminals for the unit. Thus the four rectifiers are connected together in series and are all polarized in the same direction in the electrical circuit.

In the embodiment of Figures 6 and 7, in order to insure that the second rectifier plate 15 will not be short-circuited by contact of the edge of the plate with the sloping parts of bridging element 52, a pair of projectors 56 are embossed up from the body portion 58 of receptacle 57 at the right-hand edge of the area occupied by the plate to keep the plate from moving into contact with the sloping part of the bridging element. The end 53 of element 52 which extends under the second element is turned up slightly at 59 to engage metal contact layer 17. Similar projections 56 are provided at the right-hand edge of the fourth plate 15 and the inner end of terminal 55 is turned up at 60 to engage layer 17 of the fourth plate.

Thus it will be seen that there has been provided a rectifier unit capable of mounting in limited or narrow space and which provides good cooling means for each of the rectifier plates, and in which individual plates are readily removable and replaceable. It will also be seen that a rectifier unit has been provided which is economical to manufacture, convenient to assemble and adaptable to mounting in a variety of ways and for a variety of applications such as a rectifier in a radio set or piece of electronic equipment and for other uses.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A metal plate rectifier unit comprising a plurality of metal plate rectifiers disposed in substantially the same plane, a receptacle formed at least in part of insulating material holding said rectifiers, means for holding said rectifiers in said receptacle, said means being devoid of any portion passing through said rectifiers, said receptacle being of a thickness in a direction perpendicular to the plane of said rectifiers which is small in relation to its other two dimensions, and couductive bridging elements electrically connecting together oppositely polarized faces of adjacent rectifiers to connect said plurality of rectifiers together in electrical series, whereby said rectifier unit comprises a relatively flat assembly having the spacial dimension which is perpendicular to the plane of said rectifiers relatively smaller than the other two spacial dimensions.

2. A metal plate rectifier unit comprising a plurality of metal plate rectifiers disposed in substantially the same plane, a receptacle of insulating sheet material holding said rectifiers, said sheet material being deformed to provide supporting areas for said metal plate rectifiers and raised retaining portions adjacent said supporting areas for preventing displacement of said rectifiers, said receptacle being of a thickness in a direction perpendicular to the plane of said rectifiers which is small in relation to its other two dimensions, and conductive bridging elements electrically connecting together oppositely polarized faces of adjacent rectifiers to connect said plurality of rectifiers together in electrical series, whereby said rectifier unit comprises a relatively flat assembly having the spacial dimension which is perpendicular to the plane of said rectifiers relatively smaller than the other two spacial dimensions whereby none of said rectifiers are entered by supporting or connecting means.

3. A metal plate rectifier unit according to claim 2, in which said sheet material is also deformed to provide mounting projections for mounting said receptacle in spaced relation to a support.

4. A metal plate rectifier unit according to claim 2, in which said supporting areas are provided with apertures and said rectifiers are disposed over said apertures.

5. A metal plate rectifier unit comprising a plurality of metal plate rectifiers aligned in a row with their bodies in substantially the same plane, a receptacle comprising a shallow channel of insulating material holding said rectifiers, the sides of said channel retaining said rectifiers against lateral displacement, said receptacle being of a thickness in a direction perpendicular to the plane of said rectifiers which is small in relation to its other two dimensions, and conductive bridging elements electrically connecting together oppositely polarized faces of adjacent rectifiers to connect said plurality of rectifiers together in electrical series, whereby said rectifier unit comprises a relatively flat assembly having the spacial dimension which is perpendicular to the plane of said rectifiers relatively smaller than the other two spacial dimensions and said rectifiers therein are not entered by supporting or connecting means.

6. A metal plate rectifier unit comprising a plurality of metal plate rectifiers disposed in substantially the same plane, a receptacle formed of insulating sheet material holding said rectifiers, said sheet material being deformed to provide supporting areas for said metal plate rectifiers and raised retaining portions adjacent said supporting areas for preventing displacement of said rectifiers, said receptacle being of a thickness in a direction perpendicular to the plane of said rectifiers which is small in relation to its other two dimensions, and metal bridging strips secured to said receptacle and engaging oppositely polarized faces of adjacent rectifiers to connect said plurality of rectifiers together in electrical series, whereby said rectifier unit comprises a relatively flat assembly having the special dimension which is perpendicular to the plane of said rectifiers relatively smaller than the other two spacial dimensions and said rectifiers therein are not entered by supporting or connecting means.

7. A metal plate rectifier unit according to claim 6, in which said metal bridging strips comprise spring strips secured at their mid-portion to said receptacle and having one end projecting into contact with one of said rectifiers and the other end projecting into contact with another of said rectifiers, and a pair of metal end terminals secured to said receptacle and engaging the faces of the rectifiers at the ends of said electrical series which are not engaged by said metal bridging strips.

8. A metal plate rectifier unit according to claim 7, in which said metal bridging strips and said metal end terminals are formed of sheet metal and individual rivet-like members pass through aligned holes in said strips and terminals and in said receptacle to secure said strips and terminals to said receptacle.

9. A metal plate rectifier unit according to claim 8, in which said receptacle is deformed to provide raised bosses and said holes in said receptacle receiving said rivet-like members are in said bosses.

10. A metal plate rectifier unit according to claim 9, in which at least one of said terminals has a portion overlying a mounting portion of said receptacle and said portions are provided with aligned mounting holes for securing said unit to a base and electrically grounding one end of said series of rectifiers to said base.

11. A metal plate rectifier unit comprising a plurality of metal plate rectifiers disposed in substantially the same plane, a receptacle formed of insulating material holding said rectifiers, said material being formed to provide supporting areas for said metal plate rectifiers and raised retaining portions adjacent said supporting areas for preventing displacement of said rectifiers, said receptacle being of a thickness in a direction perpendicular to the plane of said rectifiers which is small in relation to its other two dimensions, and metal bridging and terminal members secured to said receptacle and engaging oppositely polarized faces of adjacent rectifiers to connect said plurality of rectifiers together in electrical series, at least some of said metal bridging and terminal members comprising spring fingers in pressure contact with the outer faces of said rectifiers, said rectifiers being retained in said receptacle by said spring fingers, said supporting surfaces, and said retaining portions whereby none of the active surface of said rectifiers is interrupted.

12. A metal plate rectifier unit comprising a shallow receptacle of insulating sheet material having a plurality of rectifier mounting areas, said sheet material being deformed to provide raised retaining portions alongside said mounting areas for the purpose of holding said rectifiers in place, individual metal plate rectifiers mounted respectively in said mounting areas, all of said rectifiers being disposed substantially against the body of said receptacle, and a plurality of metal bridging and terminal elements secured to said receptacle and having contact arms extending into contact with the oppositely polarized faces of adjacent rectifiers to connect said rectifiers together in electrical series also serving to hold said rectifiers in place and in combination with the above recited areas and retaining portions comprising the sole means for such purpose.

13. A metal plate rectifier unit as claimed in claim 12, in which said metal plate rectifiers are all arranged with their negatively polarized sides all facing in one direction and their positively polarized sides all facing in the opposite direction and said bridging elements are disposed over one element and under the next adjacent element.

14. A metal plate rectifier unit as claimed in claim 12, in which said metal plate rectifiers are arranged with adjacent rectifiers having their positive sides facing in opposite directions and alternate bridging elements are disposed over two adjacent elements and under two adjacent elements, respectively.

15. A metal plate rectifier unit comprising a receptacle comprising a strip of insulating sheet material having its edges turned up to form a shallow channel, said sheet material being deformed to provide raised portions at spaced intervals along said channel, said raised portions defining a series of rectifier mounting areas between them, individual metal plate rectifiers mounted respectively in said mounting areas substantially parallel to the bottom of said channel, and a plurality of metal bridging and terminal elements secured to said raised portions and extending into contact with oppositely polarized faces of the adjacent rectifiers to connect said rectifiers together in electrical series and in co-operation with said turned up edges and raised portions comprising the sole means for holding said individual rectifiers in place.

CHESTER A. KOTTERMAN.

REFERENCES CITED

The following references are of record in the file of this patent:

UNITED STATES PATENTS

| Number | Name | Date |
|---|---|---|
| 2,215,667 | Sherman | Sept. 24, 1940 |

FOREIGN PATENTS

| Number | Country | Date |
|---|---|---|
| 114,329 | Australia | Dec. 2, 1941 |